(12) United States Patent
Shih

(10) Patent No.: US 11,710,958 B2
(45) Date of Patent: Jul. 25, 2023

(54) POWER SYSTEM WITH ENHANCED POWER SAFETY

(71) Applicant: TAIWAN POWER COMPANY, Taipei (TW)

(72) Inventor: Chi-Liang Shih, Taipei (TW)

(73) Assignee: TAIWAN POWER COMPANY, Taipei (TW)

( * ) Notice: Subject to any disclaimer, the term of this patent is extended or adjusted under 35 U.S.C. 154(b) by 22 days.

(21) Appl. No.: 17/513,696

(22) Filed: Oct. 28, 2021

(65) Prior Publication Data

US 2022/0166209 A1 May 26, 2022

(30) Foreign Application Priority Data

Nov. 25, 2020 (TW) .................................. 109141357

(51) Int. Cl.
*H02H 5/10* (2006.01)
*H02H 1/00* (2006.01)
*H02H 7/22* (2006.01)
*H02H 7/00* (2006.01)

(52) U.S. Cl.
CPC ............ *H02H 5/10* (2013.01); *H02H 1/0092* (2013.01); *H02H 7/224* (2013.01); *H02H 7/005* (2013.01)

(58) Field of Classification Search
CPC ........ H02H 7/224; H02H 5/10; H02H 1/0092; H02H 7/005
See application file for complete search history.

(56) References Cited

U.S. PATENT DOCUMENTS

| | | | | | |
|---|---|---|---|---|---|
| 4,604,674 | A | * | 8/1986 | Hamel | H02H 7/224 361/72 |
| 5,822,165 | A | * | 10/1998 | Moran | H02H 3/07 361/76 |
| 2012/0140367 | A1 | * | 6/2012 | Wimmer | H02H 7/261 361/62 |
| 2014/0293494 | A1 | * | 10/2014 | Allen | H02J 13/00034 361/93.1 |
| 2015/0311699 | A1 | * | 10/2015 | Wimmer | H04B 3/54 700/19 |

* cited by examiner

*Primary Examiner* — Harry R Behm
(74) *Attorney, Agent, or Firm* — Hamre, Schumann, Mueller & Larson, P.C.

(57) ABSTRACT

A power system includes multiple power units (PUs), each including a circuit breaker (CB), a local controller (LC) and an intelligent electronic device (IED). For any one of the PUs, the IED, when determining that the CB has mechanically failed, outputs a disconnect message via a network to the IED(s) of the remaining PU(s). For each of the remaining PU(s), based on the disconnect message, the IED thereof, when determining that the corresponding CB is a relevant CB, outputs a trip control signal that indicates to trip for receipt by the corresponding LC, so that the LC causes the CB to switch to an open state.

7 Claims, 3 Drawing Sheets

POWER SYSTEM WITH ENHANCED POWER SAFETY

CROSS-REFERENCE TO RELATED APPLICATION

This application claims priority of Taiwanese Patent Application No. 109141357, filed on Nov. 25, 2020.

FIELD

The disclosure relates to a power system, and more particularly to a power system with enhanced power safety.

BACKGROUND

A conventional power system, when detecting a fault condition, outputs a signal that indicates to trip to a circuit breaker thereof, so as to cause the circuit breaker to switch from a closed state to an open state. If the circuit breaker is in a normal state, a movable part of the circuit breaker would be held at a trip position corresponding to the open state, so the circuit breaker is constantly in the open state. If the circuit breaker has mechanically failed, holding the movable part at the trip position would be impossible, and the movable part would move back and forth between the trip position and a reset position that corresponds to the closed state (i.e., pumping (repeated switching between the open state and the closed state) of the circuit breaker would occur). The movable part would be continuously supplied with mechanical energy, so the pumping would continue, and a fault current would appear again and again and clearing of the fault current would not be possible.

SUMMARY

Therefore, an object of the disclosure is to provide a power system that can alleviate the drawback of the prior art.

According to the disclosure, the power system includes a plurality of power units. Each of the power units has a first terminal and a second terminal, is electrically coupled via at least one of the first terminal or the second terminal to at least one of remaining one(s) of the power units, and includes a circuit breaker, a local controller and an intelligent electronic device. The circuit breaker is electrically coupled between the first and second terminals, and is switchable between an open state and a closed state. The local controller is electrically coupled to the circuit breaker, and is operable to control switching of the circuit breaker. The intelligent electronic device is electrically coupled to the local controller, and includes a database that stores first position data and second position data. The first position data indicates a position of the circuit breaker. The second position data indicates a position of the circuit breaker of each of said at least one of the remaining one(s) of the power units. The intelligent electronic devices of the power units are communicably coupled together via a network. In any one of the power units, the intelligent electronic device, when detecting that the circuit breaker switches from the closed state to the open state at least a predetermined number of times during a predetermined time period, determines that the circuit breaker has mechanically failed; and the intelligent electronic device, when determining that the circuit breaker has mechanically failed, outputs a disconnect message that contains a trip command and the first position data stored in the database via the network to the intelligent electronic device(s) of the power unit(s) other than said any one of the power units. In each of the power unit(s) other than said any one of the power units, the intelligent electronic device, when deciding that the position indicated by the first position data contained in the disconnect message is identical to one of the position(s) indicated by the second position data stored in the database, determines that the circuit breaker is a relevant circuit breaker; and the intelligent electronic device, when determining that the circuit breaker is a relevant circuit breaker, outputs a trip control signal that indicates to trip based on the trip command contained in the disconnect message for receipt by the local controller, so that the local controller causes the circuit breaker to switch to the open state.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
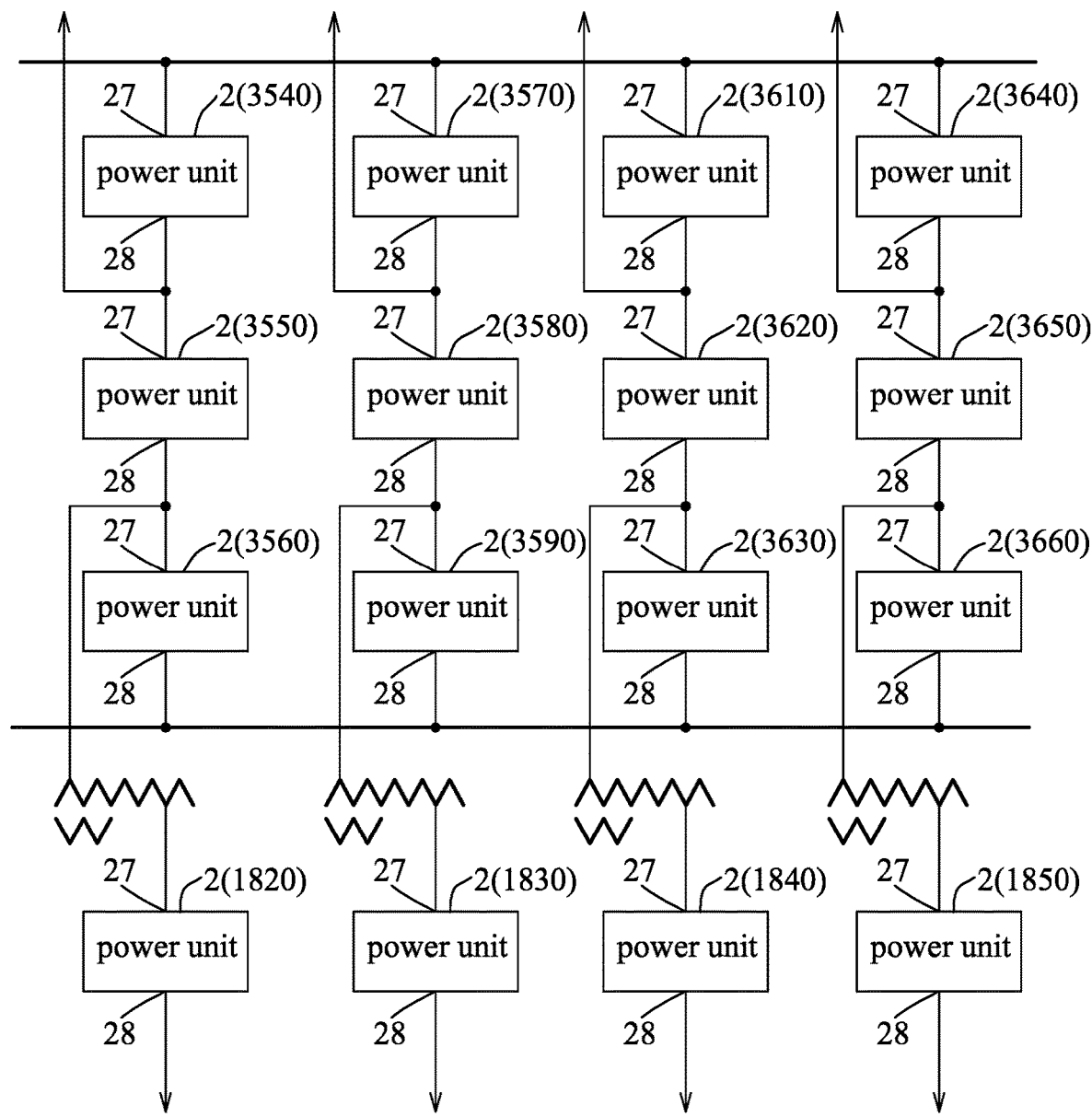
FIG. 1 is a circuit block diagram illustrating an embodiment of a power system according to the disclosure.
Figure 2:
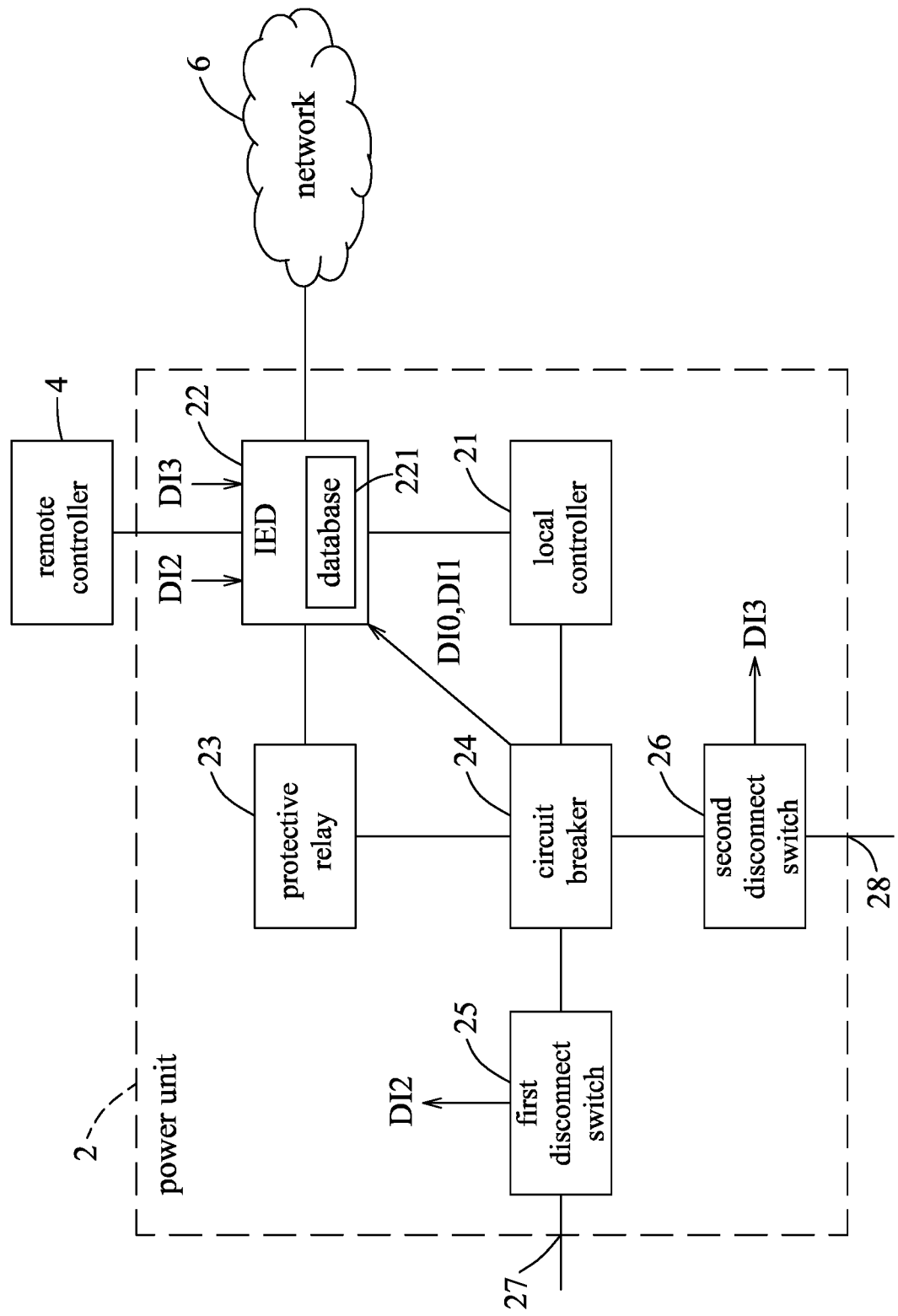
FIG. 2 is a block diagram illustrating a power unit of the embodiment.

Referring to FIGS. 1 and 2, an embodiment of a power system according to the disclosure includes a plurality of power units 2 and a remote controller 4. Each of the power units 2 has a first terminal 27 and a second terminal 28, and is electrically coupled via one or both of the first and second terminals 27, 28 to at least one of remaining one(s) of the power units 2. In an implementation as shown in FIG. 1, the power system includes sixteen power units 2, which are also respectively labeled as 3540, 3550, 3560, 3570, 3580, 3590, 3610, 3620, 3630, 3640, 3650, 3660, 1820, 1830, 1840 and 1850.

Each of the power units 2 includes a local controller 21, an intelligent electronic device (IED) 22, a protective relay 23, a circuit breaker 24, a first disconnect switch 25 and a second disconnect switch 26.

The circuit breaker 24 and the first and second disconnect switches 25, 26 are electrically coupled between the first and second terminals 27, 28, with the first disconnect switch 25 coupled between the first terminal 27 and the circuit breaker 24, and the second disconnect switch 26 coupled between the second terminal 28 and the circuit breaker 24. The circuit breaker 24 is switchable between an open state and a closed state.

The local controller 21 is electrically coupled to the circuit breaker 24, and is operable to control switching of the circuit breaker 24.

The protective relay 23 is electrically coupled to the circuit breaker 24, and is operable to control switching of the circuit breaker 24.

The IED 22 is electrically coupled to the local controller 21, the protective relay 23, the circuit breaker 24, the first and second disconnect switches 25, 26 and the remote controller 4, and includes a database 221 that stores first position data and second position data. The first position data indicates a position of the circuit breaker 24 of the power unit 2 which the database 221 belongs to. The second position data indicates a position of the circuit breaker 24 of each of said at least one of the remaining one(s) of the power units 2. For example, in the implementation as shown in FIG. 1, the power unit 3620 is electrically coupled to the power units 3610, 3630, 1840, the first position data stored in the database 221 of the IED 22 of the power unit 3620 indicates the position of the circuit breaker 24 of the power unit 3620, and the second position data stored in the database 221 of the IED 22 of the power unit 3620 indicates the positions of the circuit breakers 24 of the power units 3610, 3630, 1840.

The IEDs 22 of the power units 2 are communicably coupled together via a network 6.

For any one of the power units 2, the IED 22, when detecting that the corresponding circuit breaker 24 switches from the closed state to the open state at least a predetermined number of times during a predetermined time period (i.e., pumping of the circuit breaker 24 occurs), determines that the circuit breaker 24 has mechanically failed, where the predetermined number is an integer greater than or equal to three. In addition, the IED 22, when determining that the corresponding circuit breaker 24 has mechanically failed, performs the following: outputting, for receipt by the local controller 21, a reset control signal (CLOSE) (see FIG. 3) that indicates not to reset, so that the local controller 21 does not cause the circuit breaker 24 to switch to the closed state; and outputting, via the network 6 to the intelligent electronic device(s) 22 of the power unit(s) 2 other than said any one of the power units 2, a disconnect message (e.g., a generic object oriented substation event message (GOOSE) (see FIG. 3)) that contains a trip command and the first position data stored in the corresponding database 221.

For each of the power unit(s) 2 other than said any one of the power units 2, the IED 22 thereof, when determining that the position indicated by the first position data contained in the disconnect message is identical to one of the position(s) indicated by the second position data stored in the database 221 (i.e., the power unit 2 is electrically coupled to said any one of the power units 2), determines that the corresponding circuit breaker 24 is a relevant circuit breaker. When determining that the circuit breaker 24 is a relevant circuit breaker, the IED 22 outputs a trip control signal that indicates to trip based on the trip command contained in the disconnect message for receipt by the corresponding local controller 21, so that the local controller 21 causes the circuit breaker 24 to switch to the open state. In addition, when determining that the position indicated by the first position data contained in the disconnect message is not identical to any one of the position(s) indicated by the second position data stored in the database 221 (i.e., the power unit 2 is not electrically coupled to said any one of the power units 2), the IED 22 determines that the circuit breaker 24 is an irrelevant circuit breaker. When determining that the circuit breaker 24 is an irrelevant circuit breaker, the IED 22 outputs the trip control signal that indicates not to trip for receipt by the local controller 21, so that the local controller 21 does not cause the circuit breaker 24 to switch to the open state.

For example, in the implementation as shown in FIG. 1, it is assumed that the IED 22 of the power unit 3620 determines that the circuit breaker 24 of the power unit 3620 has mechanically failed. In this case, for the power unit 3620, the IED 22 performs the following: outputting the reset control signal (CLOSE) (see FIG. 3) that indicates not to reset for receipt by the local controller 21, so that the local controller 21 does not cause the circuit breaker 24 to switch to the closed state; and outputting the disconnect message via the network 6 to the IEDs 22 of all other power units (namely power units 3540, 3550, 3560, 3570, 3580, 3590, 3610, 3630, 3640, 3650, 3660, 1820, 1830, 1840 and 1850).

For each of the power units 3610, 3630, 1840 that are electrically coupled to the power unit 3620, the IED 22 thereof determines that the corresponding circuit breaker 24 is a relevant circuit breaker, and outputs the trip control signal that indicates to trip for receipt by the corresponding local controller 21, so that the local controller 21 causes the circuit breaker 24 to switch to the open state. For each of the power units 3540, 3550, 3560, 3570, 3580, 3590, 3640, 3650, 3660, 1820, 1830, 1850 that are not electrically coupled to the power unit 3620, the IED 22 thereof determines that the circuit breaker 24 is an irrelevant circuit breaker, and outputs the trip control signal that indicates not to trip for receipt by the local controller 21, so that the local controller 21 does not cause the circuit breaker 24 to switch to the open state.

Figure 3:
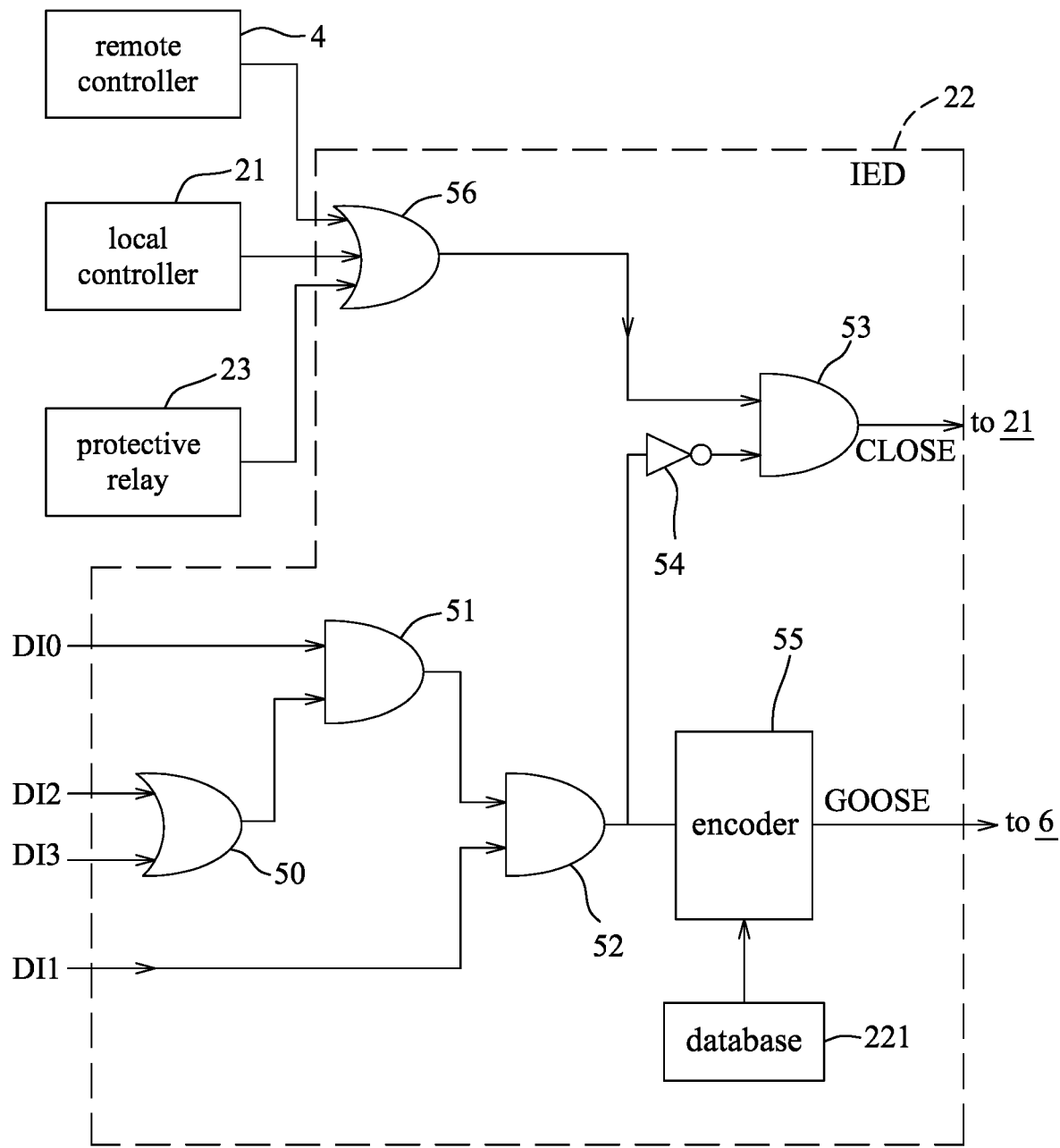
FIG. 3 is a circuit block diagram illustrating an intelligent electronic device of the power unit.

Referring to FIGS. 1 to 3, in this embodiment, for each of the power units 2, the circuit breaker 24 provides a first indication signal (DI0) and a second indication signal (DI1), the first disconnect switch 25 provides a third indication signal (DI2), and the second disconnect switch 26 provides a fourth indication signal (DI3). The first indication signal (DI0) indicates whether the circuit breaker 24 should be in the open state. The second indication signal (DI1) indicates whether arc discharge is generated at least the predetermined number of times during the predetermined time period. The third indication signal (DI2) indicates whether the first disconnect switch 25 conducts. The fourth indication signal (DI3) indicates whether the second disconnect switch 26 conducts. The IED 22 is to receive the first to fourth indication signals (DI0-DI3) from the circuit breaker 24 and the first and second disconnect switches 25, 26. The IED determines that the circuit breaker 24 has mechanically failed when all of the following conditions are met: the first indication signal (DI0) indicates that the circuit breaker 24 should be in the open state; the second indication signal (DI1) indicates that arc discharge is generated at least the predetermined number of times during the predetermined time period; and the third and fourth indication signals (DI2, DI3) cooperatively indicate that one or both of the first and second disconnect switches 25, 26 conducts. The IED 22 determines that the circuit breaker 24 has not mechanically failed when otherwise.

Moreover, the remote controller 4 provides a first control signal, the local controller 21 provides a second control signal, the protective relay 23 provides a third control signal, and the IED 22 is to receive the first to third control signals from the remote controller 4, the local controller 21 and the protective relay 23. Each of the first, second and third control signals is used to indicate whether to reset or not. The IED 22 outputs the reset control signal (CLOSE) that indicates to reset when all of the following conditions are met: the IED 22 determines that the circuit breaker 24 has not mechanically failed; and any one of the first, second and third control signals indicates to reset. The IED 22 outputs the reset control signal (CLOSE) that indicates not to reset when otherwise. The local controller 21 causes the circuit breaker 24 to switch to the closed state when the reset control signal (CLOSE) indicates to reset, and does not cause the circuit breaker 24 to switch to the closed state when the reset control signal (CLOSE) indicates not to reset.

To be specific, the IED 22 further includes a first OR gate 50, a first AND gate 51, a second AND gate 52, a third AND gate 53, an inverter 54, an encoder 55 and a second OR gate 56.

The first OR gate 50 has a first input terminal that is electrically coupled to the first disconnect switch 25 to receive the third indication signal (DI2), a second input terminal that is electrically coupled to the second disconnect switch 26 to receive the fourth indication signal (DI3), and an output terminal.

The first AND gate 51 has a first input terminal that is electrically coupled to the circuit breaker 24 to receive the first indication signal (DI0), a second input terminal that is electrically coupled to the output terminal of the first OR gate 50, and an output terminal.

The second AND gate 52 has a first input terminal that is electrically coupled to the output terminal of the first AND gate 51, a second input terminal that is electrically coupled to the circuit breaker 24 to receive the second indication signal (DI1), and an output terminal.

The first control signal (DI0) indicates that the circuit breaker 24 should be in the open state when at a logic high level, and indicates that the circuit breaker 24 should be in the closed state when at a logic low level. The second control signal (DI1) indicates that arc discharge is generated at least the predetermined number of times during the predetermined time period when at a logic high level, and indicates that arc discharge is generated less than the predetermined number of times during the predetermined time period when at a logic low level. The third control signal (DI2) indicates that the first disconnect switch 25 conducts when at a logic high level, and indicates that the first disconnect switch 25 does not conduct when at a logic low level. The fourth control signal (DI3) indicates that the second disconnect switch 26 conducts when at a logic high level, and indicates that the second disconnect switch 26 does not conduct when at a logic low level. When the first and second control signals (DI0, DI1) are at the logic high level, and any of the third and fourth control signals (DI2, DI3) is at the logic high level, a signal at the output terminal of the second AND gate 52 is at a logic high level to indicate that the circuit breaker 24 has mechanically failed. Otherwise, the signal at the output terminal of the second AND gate 52 is at a logic low level to indicate that the circuit breaker 24 has not mechanically failed.

The encoder 55 is coupled to the output terminal of the second AND gate 52 and the database 221, and is linked to the network 6. When the signal at the output terminal of the second AND gate 52 is at the logic high level, the encoder 55 encodes the first position data stored in the database 221 and the trip command to generate the disconnect message (e.g., GOOSE), and outputs the disconnect message to the network 6. When the signal at the output terminal of the second AND gate 52 is at the logic low level, the encoder 55 does not generate the disconnect message.

The inverter 54 has an input terminal that is electrically coupled to the output terminal of the second AND gate 52, and an output terminal.

The second OR gate 56 has a first input terminal that is electrically coupled to the remote controller 4 to receive the first control signal, a second input terminal that is electrically coupled to the local controller 21 to receive the second control signal, a third input terminal that is electrically coupled to the protective relay 23 to receive the third control signal, and an output terminal.

The third AND gate 53 has a first input terminal that is electrically coupled to the output terminal of the second OR gate 56, a second input terminal that is electrically coupled to the output terminal of the inverter 54, and an output terminal that is electrically coupled to the local controller 21 and that provides the reset control signal (CLOSE).

Each of the first to third control signals indicates to reset when at a logic high level, and indicates not to reset when at a logic low level. The reset control signal (CLOSE) is at a logic high level to indicate to reset when all of the following conditions are met: the signal at the output terminal of the second AND gate 52 is at the logic low level; and any of the first, second and third control signals is at the logic high level. The reset control signal (CLOSE) is at a logic low level to indicate not to reset when otherwise.

In view of the above, the power system of this embodiment has the following advantages.

1. By virtue of the IED 22 of each power unit 2 determining whether the circuit breaker 24 of the aforesaid power unit 2 has mechanically failed and, when the determination is affirmative, outputting the disconnect message to open the circuit breaker of any power unit 2 that is electrically coupled to the aforesaid power unit 2, a fault current can be cleared, thereby enhancing power safety.

2. For each power unit 2, the reset control signal (CLOSE) indicates to reset when the circuit breaker 24 is determined to have mechanically failed and any of the first, second and third control signals indicates to reset, and indicates not to reset when otherwise. Therefore, when the circuit breaker 24 has not mechanically failed, the local controller 21 would cause the circuit breaker 24 to switch to the closed state if any of the first, second and third control signals indicates to reset. When the circuit breaker 24 has mechanically failed, the local controller 21 would not switch the circuit breaker 24 to the closed state if any of the first, second and third control signals indicates to reset, the circuit breaker 24 would not be supplied with mechanical energy, and pumping of the circuit breaker 24 stops when mechanical energy of the circuit breaker 24 is exhausted.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A power system comprising:
    a plurality of power units;
    each of said power units having a first terminal and a second terminal, being electrically coupled via at least one of said first terminal or said second terminal to at least one of remaining one(s) of said power units, and including
        a circuit breaker electrically coupled between said first and second terminals, and switchable between an open state and a closed state,
        a local controller electrically coupled to said circuit breaker, and operable to control switching of said circuit breaker, and an intelligent electronic device electrically coupled to said local controller, and including a database that stores first position data and second position data, the first position data indicating a position of said circuit breaker, the second position data indicating a position of said circuit breaker of each of said at least one of the remaining one(s) of said power units;

said intelligent electronic devices of said power units being communicably coupled together via a network;

in any one of said power units, said intelligent electronic device, when detecting that said circuit breaker switches from the closed state to the open state at least a predetermined number of times during a predetermined time period, is configured to determine that said circuit breaker has mechanically failed, and said intelligent electronic device, when determining that said circuit breaker has mechanically failed, is configured to output a disconnect message that contains a trip command and the first position data stored in said database via the network to said intelligent electronic device(s) of said power unit(s) other than said any one of said power units, and output a reset control signal that indicates not to reset for receipt by said local controller so that said local controller does not cause said circuit breaker to switch to the closed state;

in each of said power unit(s) other than said any one of said power units, said intelligent electronic device, when deciding that the position indicated by the first position data contained in the disconnect message is identical to one of the position(s) indicated by the second position data stored in said database, is configured to determine that said circuit breaker is a relevant circuit breaker, and said intelligent electronic device, when determining that said circuit breaker is a relevant circuit breaker, is configured to output a trip control signal that indicates to trip based on the trip command contained in the disconnect message for receipt by said local controller, so that said local controller causes said circuit breaker to switch to the open state.

2. The power system of claim 1, wherein, in each of said power unit(s) other than said any one of said power units:

said intelligent electronic device, when deciding that the position indicated by the first position data contained in the disconnect message is not identical to any one of the position(s) indicated by the second position data stored in said database, is configured to determine that said circuit breaker is an irrelevant circuit breaker.

3. The power system of claim 2, wherein, in each of said power unit(s) other than said any one of said power units:

said intelligent electronic device, when determining that said circuit breaker is an irrelevant circuit breaker, is configured to output the trip control signal that indicates not to trip for receipt by said local controller, so that said local controller does not cause said circuit breaker to switch to the open state.

4. The power system of claim 1, wherein each of said power units further includes a first disconnect switch and a second disconnect switch, and in each of said power units:

said circuit breaker provides a first indication signal that indicates whether said circuit breaker should be in the open state, and a second indication signal that indicates whether arc discharge is generated at least the predetermined number of times during the predetermined time period, where the predetermined number is an integer greater than or equal to three;

said first disconnect switch is electrically coupled between said first terminal and said circuit breaker, and provides a third indication signal that indicates whether said first disconnect switch conducts;

said second disconnect switch is electrically coupled between said second terminal and said circuit breaker, and provides a fourth indication signal that indicates whether said second disconnect switch conducts;

said intelligent electronic device is further electrically coupled to said circuit breaker and said first and second disconnect switches to receive the first to fourth indication signals; and when the first indication signal indicates that said circuit breaker should be in the open state, when the second indication signal indicates that arc discharge is generated at least the predetermined number of times during the predetermined time period, and when the third and fourth indication signals cooperatively indicate that any of said first and second disconnect switches conducts, said intelligent electronic device is configured to determine that said circuit breaker has mechanically failed.

5. The power system of claim 4, wherein, in each of said power units, said intelligent electronic device further includes:

a first OR gate having a first input terminal that is electrically coupled to said first disconnect switch to receive the third indication signal, a second input terminal that is electrically coupled to said second disconnect switch to receive the fourth indication signal, and an output terminal;

a first AND gate having a first input terminal that is electrically coupled to said circuit breaker to receive the first indication signal, a second input terminal that is electrically coupled to said output terminal of said first OR gate, and an output terminal;

a second AND gate having a first input terminal that is electrically coupled to said output terminal of said first AND gate, a second input terminal that is electrically coupled to said circuit breaker to receive the second indication signal, and an output terminal; and an encoder coupled to said output terminal of said second AND gate and said database, and, when a signal at said output terminal of said second AND gate indicates that said circuit breaker has mechanically failed, is configured to encode the first position data stored in said database and the trip command to generate the disconnect message.

6. The power system of claim 5, wherein, in each of said power units, said intelligent electronic device further includes:

an inverter having an input terminal that is electrically coupled to said output terminal of said second AND gate, and an output terminal; and a third AND gate having a first input terminal, a second input terminal that is electrically coupled to said output terminal of said inverter, and an output terminal that is electrically coupled to said local controller and that provides the reset control signal;

wherein the reset control signal, when at a logic low level, indicates not to reset.

7. The power system of claim 6, further comprising a remote controller that provides a first control signal, wherein said power unit further includes a protective relay that provides a third control signal, and in each of said power units:

said local controller provides a second control signal;
said intelligent electronic device further includes a second OR gate;
said second OR gate has a first input terminal that is electrically coupled to said remote controller to receive the first control signal, a second input terminal that is electrically coupled to said local controller to receive the second control signal, a third input terminal that is electrically coupled to said protective relay to receive the third control signal, and an output terminal that is electrically coupled to said first input terminal of said third AND gate; and
each of the first to third control signals and the reset control signal, when at a logic high level, indicates to reset.

* * * * *